(12) United States Patent
Calmettes et al.

(10) Patent No.: US 8,564,480 B2
(45) Date of Patent: Oct. 22, 2013

(54) SATELLITE BASED AUGMENTATION SYSTEM

(75) Inventors: Thibaud Calmettes, Ville (FR); Michel Monnerat, Saint Jean (FR); Damien Kubrak, Toulouse (FR)

(73) Assignee: Thales, Neuilly sur Seine (FR)

( * ) Notice: Subject to any disclaimer, the term of this patent is extended or adjusted under 35 U.S.C. 154(b) by 153 days.

(21) Appl. No.: 13/272,049

(22) Filed: Oct. 12, 2011

(65) Prior Publication Data

US 2012/0274511 A1 Nov. 1, 2012

(30) Foreign Application Priority Data

Oct. 13, 2010 (FR) ...................................... 10 04030

(51) Int. Cl.
*G01S 19/07* (2010.01)
*G01S 19/41* (2010.01)

(52) U.S. Cl.
USPC ................................ 342/357.44; 342/357.24

(58) Field of Classification Search
USPC ............. 342/357.21, 357.24, 357.44, 357.46; 701/468, 470
See application file for complete search history.

(56) References Cited

U.S. PATENT DOCUMENTS

| | | |
|---|---|---|
| 2004/0088111 A1 | 5/2004 | Ahlbrecht et al. |
| 2010/0145616 A1 | 6/2010 | Van Diggelen et al. |
| 2010/0164800 A1 | 7/2010 | Onda |

OTHER PUBLICATIONS

J.R. Martin, et al., "Galileo Orbitography and Synchronization Processing Facility (OSPFP): Preliminary Design", ION GNSS 19th International Technical Meeting of the Satellite Division, Sep. 26, 2006, pp. 1-10, XP002557650.

*Primary Examiner* — Dao Phan
(74) *Attorney, Agent, or Firm* — Baker Hostetler LLP

(57) ABSTRACT

A system for augmenting the availability and performance of a satellite geolocation system uses a behavior model of at least one of the satellites of the satellite geolocation system. The behavior model includes parameters with which to augment the nominal operating range of the geolocation system. The behavior model also includes an indicator of the deviation between the behavior model and the real behavior of the at least one satellite, to enable a receiver to continue to use at least one satellite to determine the position of the receiver using the behavior model outside the nominal operating range of the satellite geolocation system. The parameters of the behavior model include at least a model of distortion of code chips transmitted by the at least one satellite to the receiver, or a model of distortion of the phase of the signal transmitted by the at least one satellite to the receiver.

8 Claims, 1 Drawing Sheet

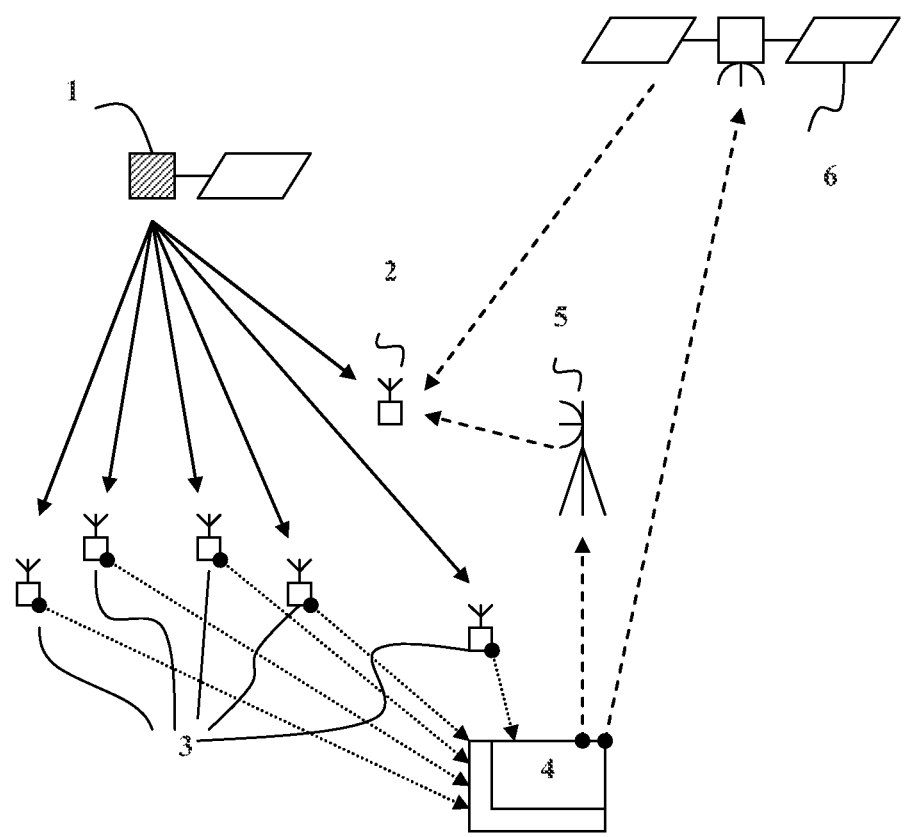

SATELLITE BASED AUGMENTATION SYSTEM

CROSS-REFERENCE TO RELATED APPLICATION

This application claims priority to foreign French patent application No. FR 1004030, filed on Oct. 13, 2010, the disclosure of which is incorporated by reference in its entirety.

FIELD OF THE INVENTION

The subject of the present invention is a satellite based augmentation system.

It relates to the field of satellite geolocation and positioning systems, also known by the abbreviation GNSS (Global Navigation Satellite System), for example the GPS or GALILEO systems, and more specifically augmentation and/or assistance methods for such systems.

BACKGROUND

The augmentation of GNSS systems denotes a method used to enhance the reliability of such systems, in particular their availability, their accuracy and their integrity. Such a method is based on the integration, in the positioning calculation, of external information relating to different types of errors that can affect the GNSS signal. These errors relate, for example, to a desynchronization of the clocks of the satellite and of the receiver, to the position information concerning the satellites supplied by their ephemerides or even to the propagation delay of the signal through the ionosphere (ionospheric delay). An example of an augmentation system is the European EGNOS system which uses a plurality of ground stations with known positions, each permanently listening to the GNSS signals transmitted by the satellites and performing measurements on these signals. From the measurements made, notably concerning the time of reception of the signals, a message is transmitted to the users, via a relay satellite, to inform them as to the integrity of the positioning signal transmitted by the geolocation satellites. Such a message may also contain a correction to be applied to the measurement performed on the GNSS signal in order to determine positioning information. This correction is, for example, a time correction to be applied at the measured instant of reception of the GNSS signal. The application of this correction will enable the user to improve the accuracy of his or her positioning.

Thus, such a system makes it possible to augment the availability of the satellite positioning system since it generates suitable corrections that make it possible to use the GNSS signal even when it is affected by errors. In practice however, when the error measured by the ground stations exceeds a nominal operating threshold of the GNSS constellation, defined in the specifications of the GNSS system, the message transmitted simply indicates to the user that the corresponding positioning satellite is inoperative and that the user should perform his or her positioning by using the other satellites of the constellation, or even another positioning means if the satellite coverage is no longer sufficient.

The augmentation of a GNSS system can also be performed by transmission means other than satellite means. In particular, the correction and/or alert information can be transmitted through a cellular telephony network in the case where the GNSS receiver also includes reception means adapted to such a network. An example of such a system is the assistance system for GPS, known by the acronym A-GPS.

Hereinafter in the description, the term augmentation will be used to denote all the systems that make it possible to enhance the availability and the reliability of a satellite positioning system, whether these systems use satellite transmission means or, more generally, radio channel or cellular transmission means.

Augmentation thus has two functions: on the one hand, to warn the user of an operating problem affecting a satellite of the GNSS system so that the user will not use it, and also to provide the user with corrections enabling him or her to improve the measurements performed on a satellite of the GNSS system in its operating range.

SUMMARY OF THE INVENTION

The aim of the invention is notably to overcome the limitations of the existing augmentation and assistance systems by making it possible to further augment the availability and the performance of the satellite positioning systems. In particular, if the GNSS signal transmitted by a geolocation satellite and received by a receiver is modified so that it no longer conforms to the specifications of the GNSS system, the aim of the present invention is to avoid the unavailability of said satellite and maintain its use for the receiver positioning calculation.

This objective is notably achieved by enabling the user to exploit assistance or augmentation metrics even in the case where a satellite exhibits operation that differs from its nominal operation.

The subject of the invention is a system for augmenting the performance of a satellite geolocation system consisting of at least one satellite and at least one positioning receiver and defined by a nominal operating range, said augmentation system comprising at least one system for measuring signals transmitted by said geolocation system, a processing centre receiving the measurements transmitted by the measurement system and producing anomaly correction or alert messages concerning the unavailability of said geolocation system to said receivers, terrestrial or satellite means for broadcasting said correction or alert messages to said receivers, said augmentation system being characterized in that the correction or alert messages contain at least:
  a behaviour model of at least one of the satellites of said geolocation system incorporating new parameters with which to augment the operating range of said system and
  an indicator of the deviation between said model and the real behaviour of said geolocation satellite, so as to enable the receiver to continue to use said geolocation satellite to determine its position, using the behaviour model, and outside the nominal operating range of the geolocation system,
  said parameters of the behaviour model consisting of at least:
    a model of distortion of the code chips transmitted by said navigation satellite to said receiver, or
    a model of distortion of the phase of the signal transmitted by said navigation satellite to said receiver.

In a variant embodiment of the invention, the distortion models are obtained by a Lagrange, Fourier, Tchebychev or Taylor series decomposition of the deviation between the nominal form of the signal and the real form of the signal.

In a variant embodiment of the invention, said positioning receivers are adapted to correct the positioning measurements performed on the signals received by said geolocation satellites, said corrections being determined from the behaviour model and/or from the indicator.

In a variant embodiment of the invention, the indicator corresponds to status information concerning the availability of the geolocation system.

In a variant embodiment of the invention, the indicator corresponds to quality and/or reliability information concerning said geolocation satellite.

In a variant embodiment of the invention, the behaviour model consists of ephemerides of said navigation satellites.

In a variant embodiment of the invention, the behaviour model is identical to the usual behaviour model of the geolocation system but uses shorter refresh periods.

Also the subject of the invention is a satellite positioning receiver comprising means for receiving a plurality of geolocation signals transmitted by a plurality of satellites of a geolocation system, characterized in that it also comprises means adapted to receive correction and/or alert messages generated by the augmentation system according to the invention and means adapted to take account of the indicators contained in said messages to determine which satellites of said geolocation system are available and/or to correct its positioning.

BRIEF DESCRIPTION OF THE DRAWINGS

Other features and advantages of the invention will become apparent from the following description, given in light of the single FIG. 1, a diagram of the system according to the invention.

DETAILED DESCRIPTION

The GNSS signal transmitted by a geolocation satellite towards a positioning receiver has to conform to a certain number of specifications for this receiver to identify and use this signal to calculate its position. In various situations, this signal no longer conforms to the specifications of the positioning system. The receiver is then notified, through an assistance system, of this nonconformity and then has to perform a new search on another operational satellite to be able to determine its positioning, or even make use of another positioning system. Examples of such situations will now be described.

A classic case of unavailability of the satellite positioning system relates to the case of an orbital manoeuvre. In such a case, the satellite continues to transmit but has to warn the receiver that it cannot be used by sending a message containing its status (useable or not). In its nominal operation, the geolocation satellite periodically transmits to the receiver ephemerides that make it possible to determine its position for a given time period, typically of the order of two hours. During this period, the position of the satellite can be determined from the ephemerides and from the model of variation of the position of the satellite on its orbit established according to its orbital parameters. During a manoeuvre, the satellite performs movements that no longer correspond to this model. The receiver can therefore no longer determine the exact position of the satellite that is necessary to the calculation of its positioning. To overcome this problem, it is necessary to provide the receiver with ephemerides that are valid for a shorter period, for example ten minutes, and to update these ephemerides at a faster rate than in the nominal case. In the case where the time of the manoeuvre is known, it is possible to also supply a single structure containing the ephemeride before the manoeuvre, the ephemeride during the manoeuvre and the ephemeride after the manoeuvre, and the associated validity time and precision information. Another anomaly affecting the satellite positioning system relates to the clock skips on board the satellite. Clock skip phenomena, substantially periodic, affect the atomic clock which can result in signal time-stamping errors. When a clock skip occurs, the satellite must transmit an alert to the receiver informing it of its unavailability during a given time period which corresponds to the time needed for the clock to stabilize itself. To determine its positioning, the receiver notably performs an estimation of the time drift between the atomic clock on board the satellite and its internal clock. This estimation is extrapolated over a given time period according to a model, more often than not a straight line or a parabola, from a measurement point. After a clock skip, the model used by the receiver is no longer valid because the drift of the atomic clock is altered. To be able to continue to use the signal transmitted by the satellite after a clock skip, it is necessary to provide the receiver with a correct model of the variation of the clock drift. For example, such a model may take the form of two straight segments and a time of separation of the validity of each of these straight lines. Any other model that makes it possible to determine, with a given accuracy, the time variation of the clock drift is compatible with the invention.

A third case of unavailability of the GNSS system concerns the distortions of the structure of the signal transmitted by a geolocation satellite. This is notably the case when the transmitter on board the satellite has imperfections. These distortions may take the form of ripples, or affect the modulation index of the signal, that is to say, the amplitude of the variation of a bit. These distortions may also result in a variation in the rise and fall times of the bits, which appears, for the receiver, as a bit timing instability. These variations may be static over all the successive chips, or only static over all the bits of one and the same chip, or variable from one bit to another.

A GNSS signal which is distorted or, more generally, affected by anomalies which mean that it no longer conforms to the specifications of the system is commonly designated by the term "evil waveform". Such a signal cannot be used as such but may become usable if suitable corrections are supplied to the receiver.

In order to augment the availability of a satellite positioning system, the present invention notably aims to provide the receiver with means for correcting the imperfections of the signal or the anomalies affecting the positioning information measurements. These means notably take the form of models that can be used to estimate the parameters needed to calculate the positioning of the receiver even when the signal no longer conforms to the specifications and the geolocation satellite is therefore not in nominal operation.

FIG. 1 represents a diagram of the equipment location assistance system according to the invention. A geolocation system comprising a number of satellites transmits to the ground a navigation signal which is received on the one hand by a positioning receiver 2 and on the other hand by a measurement system 3. Such a measurement system consists of a number of terrestrial stations responsible for performing measurements on the positioning signal in order to detect errors or anomalies resulting in nonconformity to the specifications. The measurements performed are transmitted to a processing centre 4 which determines corrections to be applied to the positioning information and/or alerts and transmits them to the receiver 2 by radio or cellular transmission means 5 or satellite transmission means 6. The receiver receives these corrections and takes them into account to determine its positioning. When the signal transmitted is defective or one of the geolocation satellites 1 is inoperative, notably for the abovementioned reasons, an alert message is transmitted to the receiver 2 to indicate to it that this satellite 1 is unavailable. In such a case, it must perform a new search for another geolocation satellite, or even, if necessary, make use of another geolocation system. By virtue of the system according to the invention, the receiver 2 receives a message, sent by the processing centre 4, containing behaviour models of the satellites, for example ephemerides, and an indicator giving the deviation between the model and the real behaviour of the satellite. The receiver 2 can then determine which satellites are available from the information contained in the message transmitted by the processing centre 4. The receiver 2 can also correct the positioning measurements that it has performed on the basis of the corrections received. The term "augmentation system" is used to denote the assembly consisting of the measurement receivers 3, the processing centre 4 and the transmission means 5, 6.

The corrections determined by the processing centre 4 are of several types.

In the case where an error affects the position of the geolocation satellite 1, for example during a satellite manoeuvre, the appropriate corrections are determined on the basis of ephemerides with short validity, or ephemerides complemented with additional orbital parameters. For example, the ephemerides model of a satellite enables it to be positioned with an accuracy of one metre. If a satellite performs an orbital manoeuvre, a number of examples of modelling of its behaviour during this manoeuvre can be envisaged. The first example of modelling (A) consists in retaining the conventional ephemerides model with the same two-hour validity period; in this case, the satellite positioning accuracy will be of the order of a few kilometres. The second example of modelling (B) consists in retaining the conventional ephemerides model with a one-minute validity period for the satellite positioning accuracy to remain one metre. A third example of modelling (C) consists in retaining the conventional ephemerides model with a fifteen-minute validity period so that the satellite positioning accuracy is, on average, of the order of ten metres.

Another example of modelling (D) consists in supplying three conventional ephemerides models, valid respectively before, during and after the measurement, and associated with the manoeuvre start and end times.

A final example of modelling (E) consists in supplying initial ephemerides, then the characteristics of the manoeuvre, for example the time, the direction and the thrust amplitude, and, possibly, the conventional ephemeride model after the manoeuvre.

The solution (B) is the optimum solution, but it entails broadcasting much greater volumes of assistance data. In the cases of the solutions (A) and (C), inasmuch as the performance of the positioning system is degraded relative to its nominal operation, a conventional augmentation system ought to declare this satellite unusable. However, in the case (C), it can be seen that the error committed on average disturbs the positioning only weakly, which is acceptable for most applications, and that, in addition, since this error is an average error, it is sometimes much lower. The solution (E) is advantageous in terms of volume of data, but it requires a greater number of calculations for the receiver.

Other types of errors affecting the radio navigation signal can be modelled and corrected by virtue of the augmentation system according to the invention. In the case where the error directly affects the transmitted signal (case of the "evil waveforms" mentioned previously), models that make it possible to correct the bias and the ripple of the phase of the signal are supplied.

In the first case, the models consist of a set of parameters that make it possible to characterize the form of the signal phase distortion, that is to say, the deviation between the phase of the signal actually received and the nominal phase, that is to say, the expected signal. This characterization can be obtained, according to the desired accuracy, by suitable models, based for example on Lagrange, Fourier, Taylor or Tchebychev decompositions. Based on this information, the receiver can correct the phase of the GNSS signal replicas that it generates to make the correlation between the received signal and the local replica, which forms the basis of the GNSS location procedure. Similarly, the spreading code of the signal can also be corrected on the basis of similar models.

In a variant, the models transmitted to the receiver directly contain the replica of the signal to be applied, or the deviation between the replica to be applied and the nominal replica, in the form of a real or complex sampled signal. This variant results in a larger volume of data to be transmitted, but it makes it possible to guarantee a fixed accuracy regardless of the distortion observed on the signal, whereas, for the first solution, the accuracy depends on the distortion and on the order of breakdown concerned, so that accuracy, distortion and data volume are linked.

The system according to the invention also makes it possible to use models of distortion of the code chips transmitted by the navigation satellite to the receiver or models of distortion of the phase of the signal transmitted by the navigation satellite to the receiver according to the same models as those described above for the phase of the signal, that is to say, either distortion models, or a replica or a rough replica correction.

The models that make it possible to correct the "evil waveform" type errors described above are supplied to the radio navigation receivers according to the same scenarios as those described for the errors linked to the manoeuvres of the satellite.

Specifically, these models can be supplied with a set refresh period, prioritizing either a low volume of data to the detriment of accuracy with a long period, or a great accuracy with a short period but a greater volume of data.

Alternatively, the models can be supplied with a specified validity period.

Alternatively, non-generic correction models can be transmitted to the receiver which uses them to transform them into generic models.

More specifically, X(i) denotes the correction model supplied to the receiver at a given and valid instant during a specified time period i. This model X changes from one validity period (i) to the next period (i+1). The system according to the invention can supply the list of the models X(i) for each new period i.

The system according to the invention can also supply the model X(0) valid during the first initial period then the list of the deviations V(i)=X(i)−X(i−1) between the model valid for the period i−1 and the one valid for the period i, so that the receiver can retrieve the values of the model X(i) during the period i by adding the deviation V(i) supplied to the model that is valid during the preceding period i−1: X(i)=X(i−1)+V(i).

In a variant, the system according to the invention can also produce a more general model, for example a parabolic model defined by the three parameters (Y0, Y1, Y2), such that the receiver retrieves the values of the model X(i) during the period i using a parabolic interpolation given, for example, by the formula X(i)=Y0+i*Y1+i$^2$*Y2.

In addition to suitable corrections, the control centre 4 can supply a quality and reliability score concerning the model or models of corrections supplied. By indicating in the message transmitted by the augmentation system a modelling quality score rather than a status indication concerning the availability of the satellites, this enables the user to determine whether or not it is possible to use the satellite, depending on the criticality of his or her application and alternative solutions available to him or her (other available satellite, other positioning means, etc.).

The present invention offers the main advantage of significantly augmenting the availability of a satellite geolocation system.

In practice, the models according to the invention can be applied immaterially in the case where the operating range of the GNSS satellite is still within the specified tolerances (nominal range) and in the case where the operating range of the GNSS satellite is outside of the specified tolerances.

The known augmentation systems make it possible to limit the range of use of a geolocation system to its nominal range. More specifically, they make it possible to limit the use of GNSS radio navigation signals by a receiver to the nominal cases, that is to say, the cases that conform to the specifications of the system. Thus, an augmentation system makes it possible to prevent the use of radio navigation signals that do not conform because they are affected by errors with various causes, which would result in the production of incorrect geolocation information. In certain cases, the augmentation systems even restrict the nominal range to a subrange because false alarms, that is to say, cases where the augmentation system estimates that the radio navigation signal does not conform to the specifications whereas, in reality, it does, can occur. The nominal range is also restricted because safeguard periods exist before and after each event causing the unavailability of a satellite, for example before and after each manoeuvre of the satellite. During these safeguard periods, a known augmentation system detects an unavailability of the GNSS system whereas, in reality, it is not. To sum up, the first objective of the known augmentation systems is to guarantee that the GNSS positioning system operates in its nominal range, that is to say, in accordance with its specifications. The expression "augmented positioning system" is then used to denote the assembly consisting of the satellite positioning system and the augmentation system.

Unlike the known augmentation systems, the system according to the invention makes it possible to keep the augmented satellite positioning system available as long as the augmentation system itself is available and as long as the deviations of the positioning system in its nominal operation can be modelled. An important advantage of the augmentation system according to the invention is to guarantee that the satellite positioning system can be used in the operating range modelled by the augmentation system according to the invention, this operating range modelled by the augmentation system being greater than the nominal operating range of the GNSS system.

The invention claimed is:

1. A system for augmenting a performance of a satellite geolocation system including at least one satellite and at least one positioning receiver, the satellite geolocation system being defined by a nominal operating range, the satellite geolocation system comprising:
   at least one system for measuring signals transmitted by said satellite geolocation system,
   a processing centre receiving the signals transmitted by the at least one system and producing anomaly correction or alert messages concerning unavailability of said satellite geolocation system to said at least one positioning receiver, and
   terrestrial or satellite means for broadcasting said correction or alert messages to said at least one positioning receiver,
   wherein the correction or alert messages comprise a behaviour model of at least one of the satellites of said satellite geolocation system, the behaviour model incorporating parameters with which to augment the nominal operating range of said satellite geolocation system, and an indicator of a deviation between said behaviour model and a real behaviour of said at least one satellite, to enable the at least one positioning receiver to continue to use said at least one satellite to determine the position of the at least one positioning receiver using the behaviour model outside of the nominal operating range of the satellite geolocation system,
   said parameters of the behaviour model comprising a model of distortion of code chips transmitted by said at least one satellite to said at least one positioning receiver, or a model of distortion of a phase of the signals transmitted by said at least one satellite to said at least one positioning receiver.

2. The system according to claim 1, wherein the models of distortion are obtained by a Lagrange, Fourier, Tchebychev or Taylor series decomposition of a deviation between a nominal form of the signals and a real form of the signals.

3. The system according to claim 1, wherein said at least one positioning receiver positioning is adapted to correct positioning measurements performed on signals received by said at least one satellite, said corrections being determined from the behaviour model and/or from the indicator.

4. The system according to claim 1, wherein the indicator corresponds to status information concerning availability of the satellite geolocation system.

5. The system according to claim 1, wherein the indicator corresponds to quality and/or reliability information concerning said satellite geolocation satellite.

6. The system according to claim 1, wherein the behaviour model consists of ephemerides of said at least one satellite.

7. The system according to claim 1, wherein the behaviour model comprises a usual behaviour model of the satellite geolocation system with shorter refresh periods.

8. A satellite navigation receiver, comprising:
   means for receiving a plurality of geolocation signals transmitted by a plurality of satellites of a geolocation system,
   means for receiving correction and/or alert messages generated by the augmentation system according to claim 1, and
   means for taking account of indicators contained in said messages to determine which satellites of said satellite geolocation system are available and/or to correct positioning of said satellite navigation receiver.

* * * * *

UNITED STATES PATENT AND TRADEMARK OFFICE
CERTIFICATE OF CORRECTION

PATENT NO. : 8,564,480 B2  
APPLICATION NO. : 13/272049  
DATED : October 22, 2013  
INVENTOR(S) : Calmettes et al.

It is certified that error appears in the above-identified patent and that said Letters Patent is hereby corrected as shown below:

On the title page Item [75] Inventors:

Please replace the city of inventor Thibaud Calmettes from "Ville" to --Toulouse--.

Signed and Sealed this
Twenty-fourth Day of December, 2013

Margaret A. Focarino
*Commissioner for Patents of the United States Patent and Trademark Office*